(12) United States Patent
Langoju et al.

(10) Patent No.: US 8,892,379 B2
(45) Date of Patent: Nov. 18, 2014

(54) SYSTEM AND METHOD FOR SOFT-FIELD RECONSTRUCTION

(75) Inventors: Rajesh V. V. L. Langoju, Bangalore (IN); Wrichik Basu, Bangalore (IN); Manoj Kumar Koyithitta Meethal, Bangalore (IN); Sakethraman Mahalingam, Bangalore (IN)

(73) Assignee: General Electric Company, Schenectady, NY (US)

( * ) Notice: Subject to any disclaimer, the term of this patent is extended or adjusted under 35 U.S.C. 154(b) by 521 days.

(21) Appl. No.: 13/173,896

(22) Filed: Jun. 30, 2011

(65) Prior Publication Data

US 2013/0006558 A1 Jan. 3, 2013

(51) Int. Cl.
*G01R 25/00* (2006.01)
*G06T 11/00* (2006.01)

(52) U.S. Cl.
CPC ............................. *G06T 11/006* (2013.01)
USPC ........................ 702/65; 702/136; 702/127

(58) Field of Classification Search
USPC ................................. 702/65, 136, 127
See application file for complete search history.

(56) References Cited

U.S. PATENT DOCUMENTS

| | | | |
|---|---|---|---|
| 5,588,429 A * | 12/1996 | Isaacson et al. | 600/547 |
| 5,919,142 A | 7/1999 | Boone et al. | |
| 6,940,286 B2 | 9/2005 | Wang et al. | |
| 7,136,765 B2 * | 11/2006 | Maier et al. | 702/65 |
| 2002/0138019 A1 * | 9/2002 | Wexler et al. | 600/547 |
| 2010/0097374 A1 * | 4/2010 | Fan et al. | 345/420 |

FOREIGN PATENT DOCUMENTS

| | | |
|---|---|---|
| GB | 2272772 A | 5/1994 |
| WO | 2005022138 A1 | 3/2005 |

OTHER PUBLICATIONS

N. Bolognini et al. "Spatial Frequency Filtering in Holographic Image Reconstruction", Jan. 10, 1995, Applied Optics, vol. 34, No. 2, p. 243-248.*

Hong Yan and John C. Gore, "An Efficient Algorithm for MR Image Reconstruction Without Low Spatial Frequencies", Jun. 1990, IEEE Transactions on Medical Imaging, vol. 9 No. 2, p. 184-189.*

Dickin et al., "Determination of Composition and Motion of Multicomponent Mixtures in Process Vessels Using Electrical Impedance Tomography-I. Principles and process engineering applications", Chemical Engineering Science, vol. 48, Issue 10, pp. 1883-1897, 1993.

* cited by examiner

*Primary Examiner* — John Breene
*Assistant Examiner* — Stephanie Bloss
(74) *Attorney, Agent, or Firm* — Dean D. Small; The Small Patent Law Group

(57) ABSTRACT

A system and method for soft-field reconstruction are provided. One method includes obtaining applied input and measured output information for an excited object using a plurality of transducers and forming an admittance matrix based on the applied input and measured output information. The method also includes determining a plurality of moments using the admittance matrix and calculating a property distribution of the excited object using the plurality of moments.

19 Claims, 8 Drawing Sheets

SYSTEM AND METHOD FOR SOFT-FIELD RECONSTRUCTION

BACKGROUND

The subject matter disclosed herein relates generally to data reconstruction systems and methods, and more particularly to systems and methods to estimate properties of regions of interest, particularly in soft-field reconstructions of multi-material objects.

Soft-field tomography, such as Electrical Impedance Tomography (EIT), diffuse optical tomography, elastography, and related modalities may be used to measure the internal properties of an object, such as the electrical properties of materials comprising internal structures of the object. For example, in EIT systems, an estimate is made of the distribution of electrical conductivities of the internal structures. Such EIT systems reconstruct the conductivity and/or permittivity of the materials within the area or volume based on an applied excitation (e.g., current) and a measured response (e.g., voltage) acquired at or proximate the surface of the area or volume. Visual distributions of the estimates can then be formed.

In soft-field tomography, conventional reconstruction algorithms can solve for an impedance distribution within the object without using any prior information. However, such reconstruction processes are computationally intensive because of the iterations needed to converge to a solution. Thus, the reconstruction process for these conventional algorithms can be very time consuming and requires high speed electronics and processors. Accordingly, if rapid measurements are needed, such as for visualizing in real-time a multi-material object, such as the flow of gas through a pipe, conventional reconstruction algorithms will not perform satisfactorily. Moreover, conventional reconstruction algorithms cannot accommodate high contrast in the real impedance distribution of an object.

BRIEF DESCRIPTION

In accordance with an embodiment, a method for soft-field tomography reconstruction is provided. The method includes obtaining applied input and measured output information for an excited object using a plurality of transducers and forming an admittance matrix based on the applied input and measured output information. The method also includes determining a plurality of moments using the admittance matrix and calculating a property distribution of the excited object using the plurality of moments.

In accordance with another embodiment, a method for soft-field tomography reconstruction is provided. The method includes obtaining applied input and measured output information for an excited object using a plurality of transducers and performing a symmetrical component transform (SCT) iterative reconstruction using the applied input and measured output information. The method also includes determining a property distribution of the excited object based on the SCT iterative reconstruction.

In accordance with yet another embodiment, a soft-field tomography system is provided that includes a plurality of transducers configured for positioning proximate a surface of an object and one or more excitation drivers coupled to the plurality of transducers and configured to generate excitation signals for the plurality of transducers. The soft-field tomography system also includes one or more response detectors coupled to the plurality of transducers and configured to measure a response of the object on the plurality of transducers to the excitation applied by the plurality of transducers based on the excitation signals. The soft-field tomography system further includes a soft-field reconstruction module configured to reconstruct a property distribution of the object based on the excitation signals and the measured response using a plurality of determined moments from an admittance matrix reconstruction process.

BRIEF DESCRIPTION OF THE DRAWINGS

The presently disclosed subject matter will be better understood from reading the following description of non-limiting embodiments, with reference to the attached drawings, wherein below.

DETAILED DESCRIPTION

Figure 1:
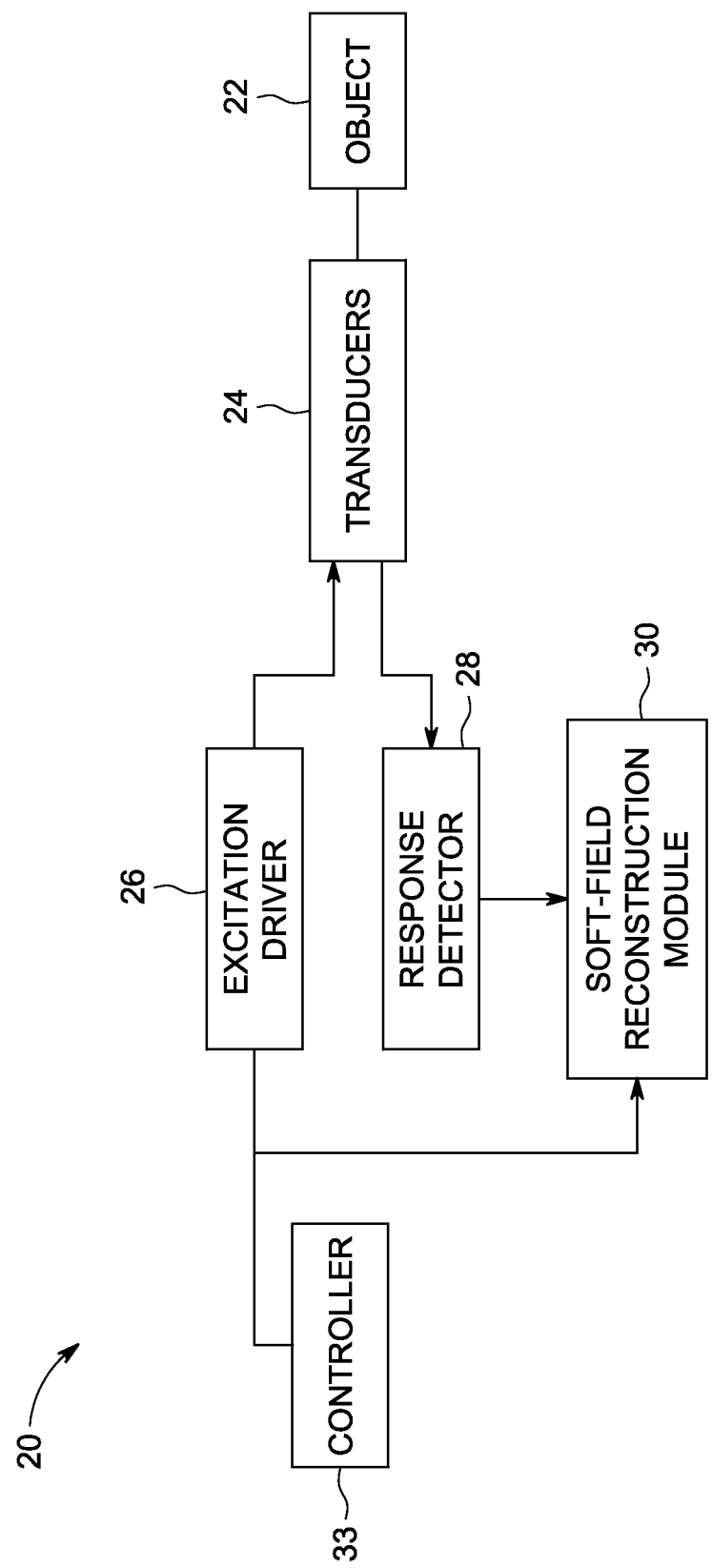
FIG. 1 is a simplified block diagram illustrating a soft-field tomography system formed in accordance with various embodiments.

The foregoing summary, as well as the following detailed description of certain embodiments, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers, circuits or memories) may be implemented in a single piece of hardware or multiple pieces of hardware. It should be understood that the various embodiments are not limited to the arrangements, component/element interconnections and instrumentality shown in the drawings.

As used herein, a module or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" a module or a plurality of modules having a particular property may include additional such modules not having that property.

Various embodiments provide a system and method for soft-field tomography, particularly of a multi-material object, that uses symmetric components to estimate properties of the multi-material object, such as the properties of flowing gases. The various embodiments provide an approach that iterates on determined moments (instead of iterating on measured currents). At least one technical effect of various embodiments is improved accuracy and speed in the visualization of the properties of multi-material objects. For example, in industrial applications, by practicing at least one embodiment, a reconstructed visual representation of a gas distribution flowing within a pipe may be provided rapidly, such as in real-time while the gas is flowing.

It should be noted that as used herein, "soft-field tomography" refers generally to any tomographic or multidimensional extension of a tomographic method that is not "hard-field tomography".

Figure 2:
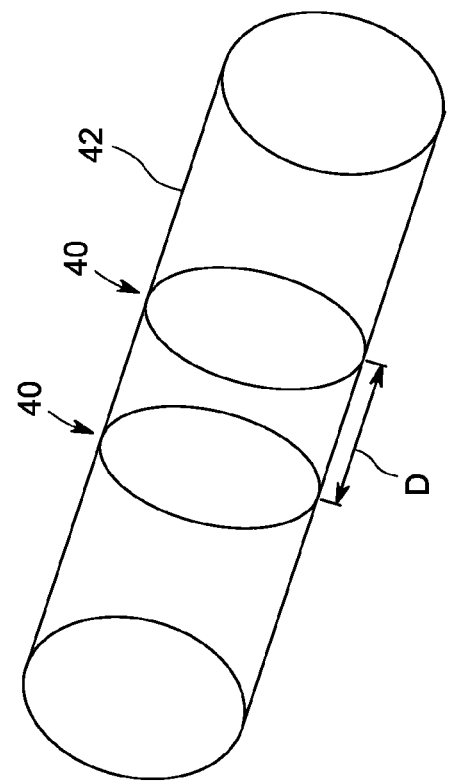
FIG. 2 is a perspective view of a transducer configuration in accordance with one embodiment.

One embodiment of a soft-field tomography system 20 is illustrated in FIG. 1. For example, the soft-field tomography system 20 may be an Electrical Impedance Tomography (EIT) system used to determine the electrical properties of materials within an object 22, particularly a multi-material object (as illustrated in FIG. 2). In one embodiment, the spatial distribution of electrical conductivity ($\sigma$) and/or permittivity ($\epsilon$) may be determined inside the object 22 or other area or volume. For example, the soft-field tomography system 20 provides EIT for multi-phase flow measurements within the object 22, such as the visualization of properties or the volumetric flow rate of gases or oils within petroleum flowing within a pipe.

In the illustrated embodiment, the system 20 includes a plurality of transducers 24 (e.g., electrodes) that are positioned within the object, such as spaced around an inner circumference of a pipe 42, and in contact with the flowing medium as shown in FIG. 2. In one embodiment, a plurality of rings 40 of transducers 24 is positioned along an inner length, such as spaced apart axially by a distance D (e.g., one meter) of the pipe 42. For example, the transducers 24 (e.g. electrodes, thermal sources, ultrasound transducers) may be positioned on a surface of the inner circumference of the pipe 42, near the surface or penetrating through the surface from outside of the pipe 42 to inside the pipe 42 (e.g., needle electrodes). Thus, the transducers 24 may take different forms, such as surface-contacting electrodes, standoff electrodes, capacitively coupled electrodes, and conducting coils such as antennas, among others. The spaced apart rings 40 may form a multi-phase flow meter in accordance with various embodiments to determine, for example, how much gas is in the pipe 42 (based on a visualization of gas and oil in the pipe 42) and the flow velocity based on a differential measurement between the rings 40 (at two locations in the pipe 42), such as by performing a cross correlation. Thus, in accordance with various embodiments, a reconstruction is performed at each of the rings 40. Accordingly, a volume visualization of gas property distribution or a determination of gas flow in the pipe 42 may be provided, such as to determine the amount of gas and oil flowing therethrough.

It should be noted that the soft-field tomography system 20 may be other types of systems. For example, the soft-field tomography system 20 may be a Diffuse Optical Tomography (DOT) system, a Near InfraRed Spectroscopy (NIRS) system, a thermography system, an elastography system or a microwave tomography system, among others.

An excitation driver 26 and a response detector 28 are coupled to the transducers 24, which are each connected to a soft-field reconstruction module 30. The soft-field reconstruction module 30 may be any type of processor or computing device that performs soft-field reconstruction based at least in part on received responses from the transducers 24 as described in more detail herein. For example, the soft-field reconstruction module 30 may be hardware, software of a combination thereof. In one embodiment, the excitation driver 26 and the response detector 28 are physically separate devices. In other embodiments, the excitation driver 26 and the response detector 28 are physically integrated as one element. A controller 33 is also provided and sends instructions to the excitation driver 26 that drives the transducers 24 based on the instructions. It should be noted that the excitation driver 26 may be provided in connection with all or a subset of transducers 24.

It also should be noted that different types of excitations may be used to obtain property distribution data for use in the reconstruction process of the various embodiments. For example, electrical, magnetic, optical, thermal or ultrasound excitations, among others, may be used in combination with the various embodiments. In these different embodiments, the transducers 24 may be coupled to the object 22 in different ways and not necessarily in direct contact or only at an inner surface of the object 22 (e.g., coupled electrically, capacitively, galvanically, etc.).

In some embodiments, the soft-field tomography system 20 can be used for generating a visual representation of the electrical impedance distribution in a variety of applications, such as for determining the material properties in a mixed fluid flow including oil and water (or other fluids or gases, such as petroleum), or for an underground earth area for soil analysis and roadbed inspection, among others. However, the embodiments may be applied to other applications, such as where the object 22 is a human body region, such as a head, a chest, or a leg, wherein air and tissues have different electrical conductivities.

In various embodiments, the transducers 24 are formed from any suitable material. For example, the types of transducer 24 used may be based on the particular application, such that a corresponding transducer type (e.g., electrode, coil, etc.) is used to generate the soft-field excitations (e.g., electromagnetic (EM) field) and receive responses of the object 22 to the excitations for the particular application. In some embodiments, a conductive material may be used to establish electrical current. For example, the transducers 24 may be formed from one or more metals such as copper, gold, platinum, steel, silver, and alloys thereof. Other exemplary materials for forming the transducers 24 include non-metals that are electrically conductive, such as a silicon based materials used in combination with micro-circuits. In one embodiment, where the object 22 is the pipe 42 with gas or fluid flowing therethrough, the transducers 24 are formed to be liquid proof. Additionally, the transducers 24 may be formed in different shapes and/or sizes, for example, as rod-shaped, flat plate-shaped, or needle-shaped structures. It should be noted that in some embodiments, the transducers 24 are insulated from one another. In other embodiments, the transducers 24 can be positioned in direct ohmic contact with the object 22 or be capacitively coupled to the object 22.

In operation, the transducers 24 or a subset of the transducers 24 may be used to transmit signals (e.g., deliver or modulate signals), for example, deliver electrical current continuously or to deliver a time-varying signal such that excitations may be applied across a temporal frequency range (e.g., 1 kHz to 1 MHz) to generate an EM field within the object 22. In an EIT application, the resulting surface potentials, namely the voltages on the transducers 24 are measured to determine an electrical conductivity or permittivity distribution using reconstruction methods as described herein. For example, a visual distribution may be reconstructed based on the geometry of the transducers 24, the applied currents and the measured voltages.

Thus, in various embodiments, the excitation driver 26 applies an excitation to each of the transducers 24 and the response detector 28 measures a response on each of the transducers 24 (which may be multiplexed by a multiplexer) in response to the excitation applied on the transducers 24. It should be noted that any type of excitation may be provided, for example, electrical current, electrical voltage, a magnetic field, a radio-frequency wave, a thermal field, an optical signal, a mechanical deformation and an ultrasound signal, among others.

Figure 3:
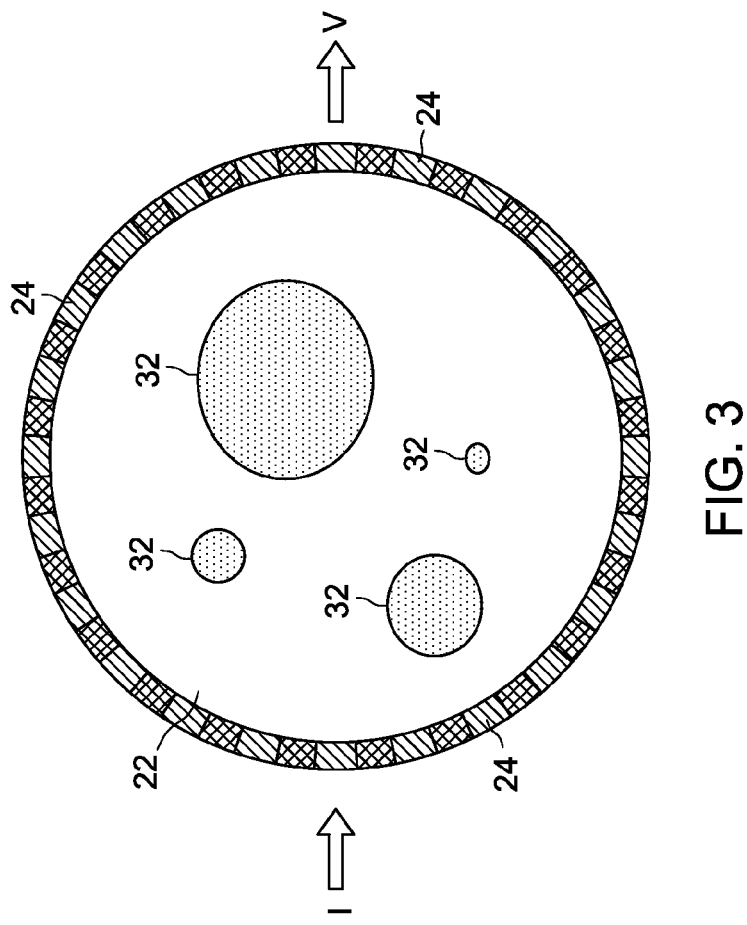
FIG. 3 is a simplified diagram illustrating reconstruction of a property distribution.

For example, in an EIT application, and as illustrated in FIG. 3, a soft-field reconstruction is performed to identify regions of interest 32 within the object 22. As shown, the response detector 28 (shown in FIG. 1) measures a response voltage (or a response current) on the transducers 24 in response to the current (or voltage) applied by the excitation driver 26 (shown in FIG. 1) to the transducers 24.

It should be noted that the response detector 28 also may include one or more analog-signal-conditioning elements (not shown) that amplifies and/or filters the measured response voltage or current. In other embodiments, a processor of the soft-field tomography system 20 includes a signal conditioning element for amplifying and/or filtering the response voltage or response current received from the response detector 28.

The soft-field reconstruction module 30, thus, computes a response of the object 22 to the applied excitation. Accordingly, the soft-field tomography system 20 may be used for reconstruction of a property distribution or flow visualization.

Figure 4:
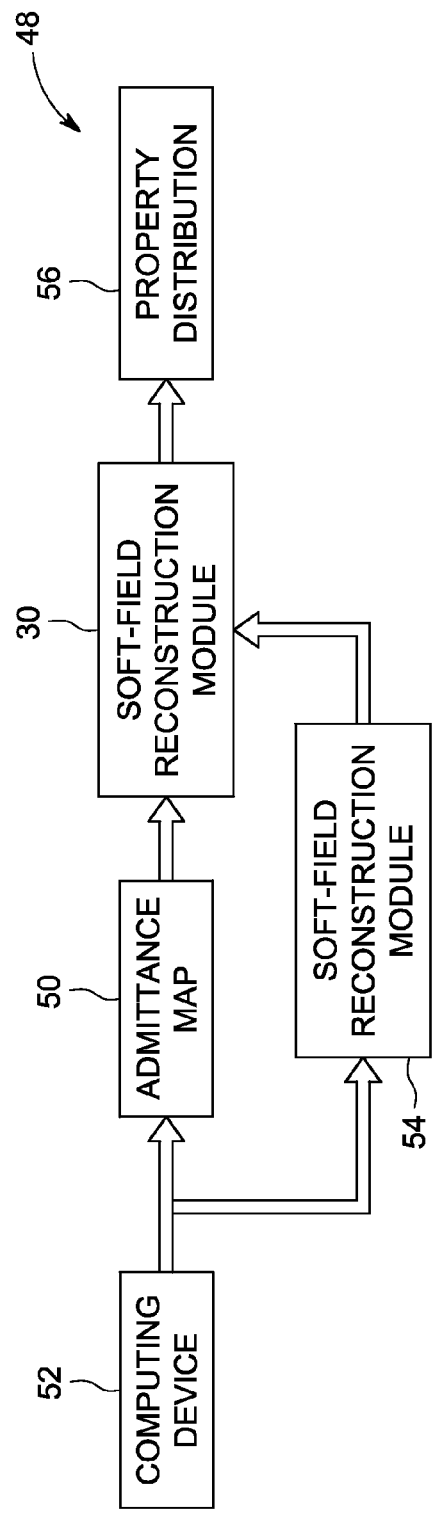
FIG. 4 is a block diagram illustrating a soft-field tomography information flow in accordance with various embodiments.

The soft-field tomography system 20 in various embodiments uses a symmetric (also referred to as symmetrical) components approach. For example, an EIT information flow 48 is illustrated in FIG. 4 that uses a symmetric components approach utilizing determined moments for reconstruction. In particular, an admittance map 50 formed from one or more matrices (e.g., precomputed matrices) based on excitations from a computing device 52 is used to predict voltages (predicted data) that are provided to the soft-field reconstruction module 30. It should be noted that in some embodiments an admittance map is optionally used. The excitations are applied to the object 22 (shown in FIGS. 1 through 3) by a soft-field tomography instrument 54, which may include the transducers 24 and other excitation and measurement components, with measured voltages (measured data) provided also to the soft-field reconstruction module 30. The soft-field reconstruction module 30 then performs reconstruction using various embodiments to generate an estimate of the property distribution 56, for example, the impedance distribution, to identify regions of interest 32 within the object 22, such as the content of different materials within a flowing liquid or gas. It should be noted that the various components may be physically separate components or elements or may be combined. For example, the soft-field reconstruction module 30 may form part of the soft-field tomography system 20 (as illustrated in FIG. 1).

Figure 5:
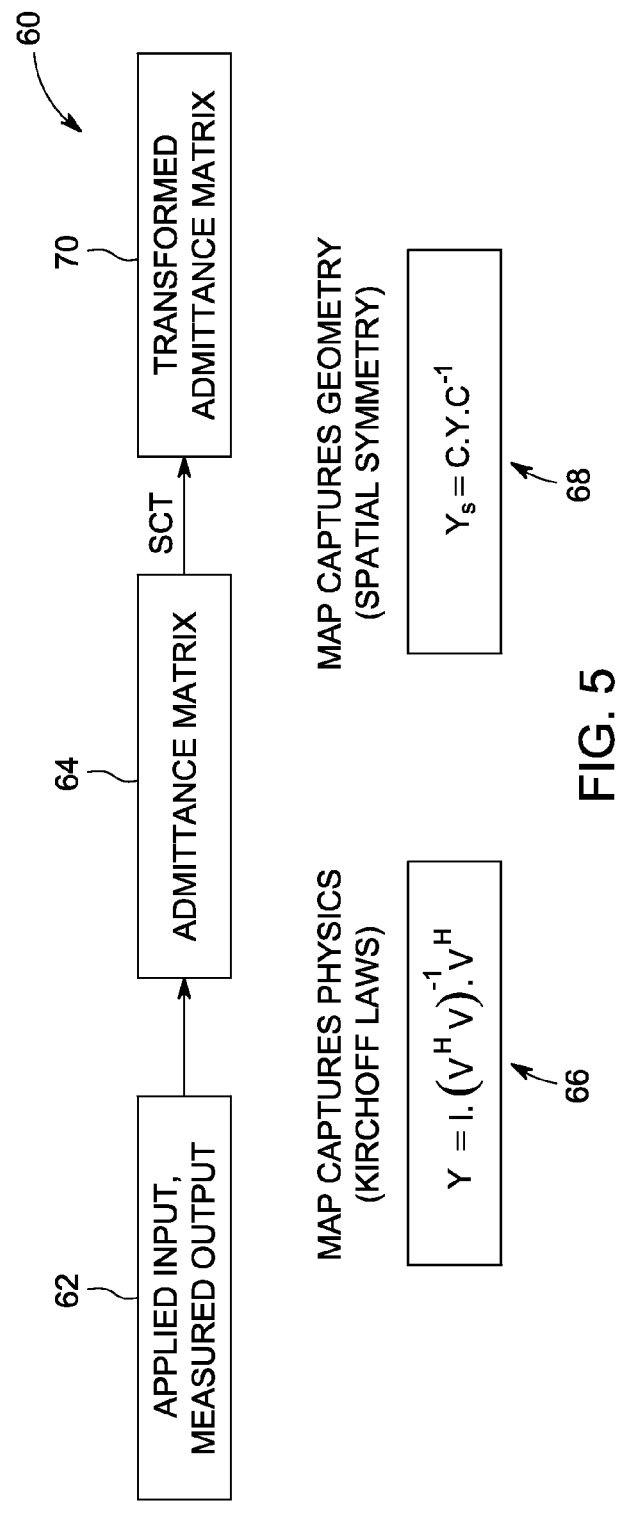
FIG. 5 is a block diagram illustrating an admittance determination flow in accordance with various embodiments.

Using various embodiments, soft-field reconstruction is provided that determines an impedance distribution without the use of priori information (and without using a forward model). For example, in one embodiment, an impedance or admittance determination may be performed as shown in the admittance determination flow 60 of FIG. 5. The admittance determination includes using at 62 applied inputs (e.g., excitations) and measured outputs (e.g., responses) by the soft-field tomography instrument 54 as an input to construct an admittance matrix 64 (or an impedance matrix) that defines the admittance map 50 or an impedance map, respectively (shown in FIG. 4) as will be described in more detail herein. The admittance matrix 64 includes admittance elements related to the moments (e.g., EM moments) as follows:

$$Y_s = f(M) \qquad \text{Equation 1}$$

$$Y_s^{p,q} = f_{p,q}(M_{p,q}) = f_{p,q} \iint \sigma(x,y)(x+iy)^{p-2}(x-iy)^{q-2} dx dy \qquad \text{Equation 2}$$

where b is a coefficient relating $Y_s$ to the moments and may be precomputed based on modeling, simulations, etc. It should be noted that in the various embodiments $\sigma = \sigma^*$. Thus, as used herein, conductivity in various embodiments includes the following three electrical properties: conductivity ($\sigma$), permeability ($\mu$) and permittivity ($\epsilon$). Accordingly, in various embodiments, the various equations used herein include the effects of or factor in $\sigma$, $\mu$ and $\epsilon$.

The moments matrix can further be defined as follows:

$$M = S\sigma \Rightarrow \sigma = (S^H S)^{-1} S^H M \qquad \text{Equation 3}$$

$$S = \iint (x+iy)^{p-2}(x-iy)^{q-2} dx dy \qquad \text{Equation 4}$$

where S is a structure matrix, which may be precomputed, for example, based on the geometry of the soft-field tomography instrument 54 (shown in FIG. 4), $\sigma$ is the conductivity to be determined, $(S^H S)^{-1} S^H$ is the pseudo-inverse of the structure matrix (e.g., a multi-row inversion), and M is the moments matrix. Thus, in one embodiment, experimentally measured moments are related using the above equations to estimate the conductivity distribution.

It should be noted that as used herein, the symbol "$\sigma$" denotes both conductivity at a point, as well as the conductivity vector.

Accordingly, admittance values (Y) may be used to determine information regarding the distribution, including the physics and geometry of the distribution as illustrated at 66 and 68, where in general $Y = I \cdot (V^H V)^{-1} \cdot V^H$ and $Y_s = Y_{transformed} = P \cdot Y \cdot Q^{-1}$, respectively. In one embodiment, P=Q=the discrete Fourier transform (DFT) matrix, C. Thus, $Y_s = C \cdot Y \cdot C^{-1}$ in this embodiment. However, it should be noted that any matrix transformation based method or algorithm may be used, and C is merely one example used herein to describe an embodiment.

The admittance matrix 64 is transformed at 70 into a transformed admittance matrix as described in more detail herein using a symmetrical component transform (SCT) approach in this embodiment, wherein Y defines the distribution in a discrete matrix. It should be noted that different types of transformations and inversion techniques may be used other than the ones described herein. Thus, the SCT approach is used for the case where P=Q=the DFT matrix, C.

Figure 6:
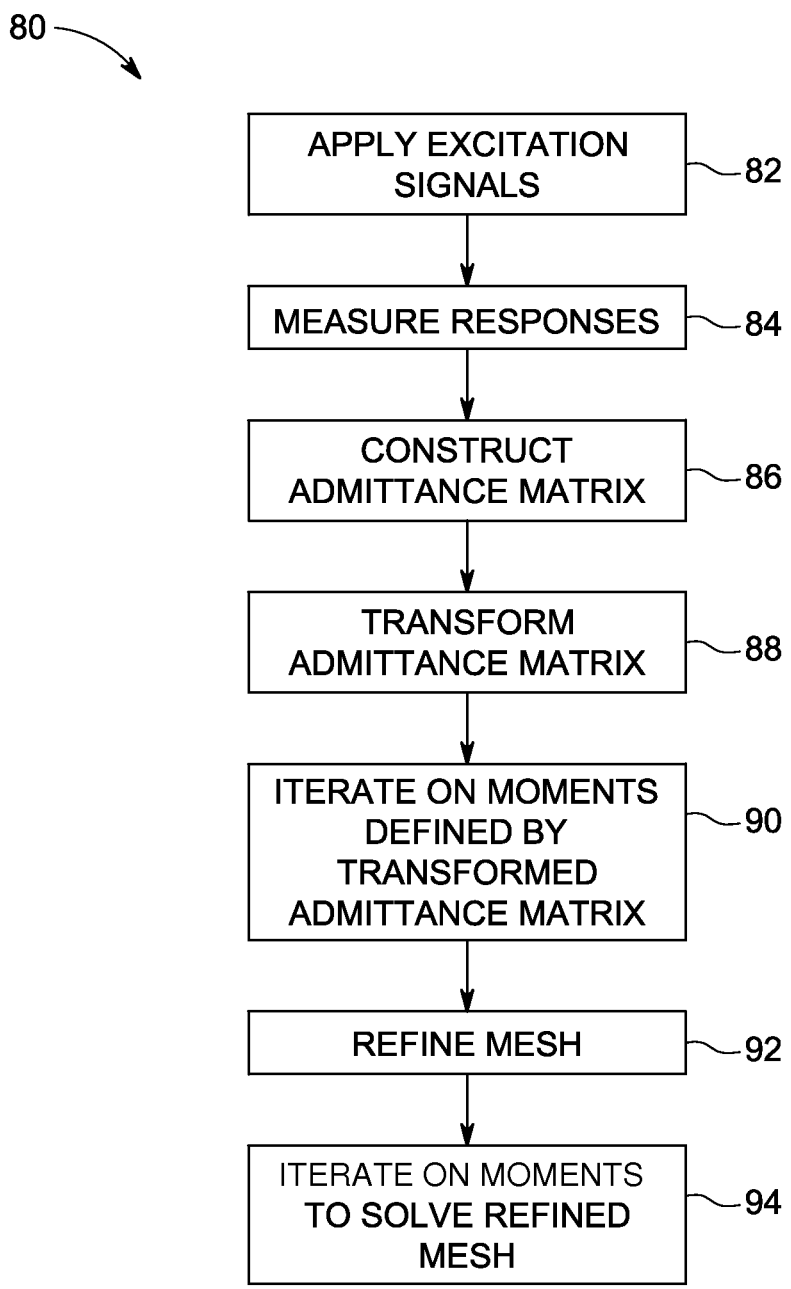
FIG. 6 is a flowchart of a method for soft-field reconstruction using symmetric components in accordance with various embodiments.

In one embodiment, a method 80 for soft-field reconstruction using symmetric components is provided as shown in FIG. 6. The method 80 will be generally described followed by a specific description of various steps, including different implementations. The method 80 includes applying excitation signals at 82 and measuring responses at 84. For example, electrical currents may be applied to an object using a plurality of transducers as described herein, with the responses measured at each of the transducers. It should be noted that the excitation signals applied at 82 may be, for example, any orthonormal signal.

Thereafter, an admittance matrix is constructed at 86 using the applied excitation signals and the measured responses. For example, the admittance matrix may define the values for the applied and measured signals at each of the plurality of transducers. The admittance matrix is then transformed at 88 using pre-multiplication and post-multiplication processes, for example, inverted using a Fourier transform matrix.

It should be noted that the distribution within the object is assumed to be homogeneous and a mesh is formed from, for example, square elements, rectangular elements or circular sectors, among others. Thus, a grid may be analytically defined. However, it should be noted that instead of a grid based approach, a shaped based approach may be used as described in more detail herein.

Then calculated moments defined by the transformed matrix are used in an iterative calculation process at 90 to estimate, for example, the electrical conductivity ($\sigma$) within the object to reconstruct a distribution within the object, such as within a multi-material object. For example, a difference in calculated moments may be determined and an estimated a updated until a convergence (within a predetermined level) is reached.

The mesh used then may be refined at 92. For example, areas may be selected for mesh refinement, with a refined mesh calculated analytically based on previously determined bounded anomalies or different materials. The iterative calculation process is then performed at 94 on the refined mesh.

With respect specifically now to the construction of the admittance matrix at 86, in one embodiment, each $Y_s$ element of the matrix corresponds to a polar moment of conductivity defined by the following set of equations:

$$Y_s(p,q) = \iint_\Omega \sigma(x,y)(x+iy)^{p-2}(x-iy)^{q-2}\,dx\,dy \quad \text{Equations 5, 6 and 7}$$

$$Y_s(p,q) = \sigma_0 \cdot \iint_{\Omega_{homogeneous}} (x+iy)^{p-2}(x-iy)^{q-2}\,dx\,dy$$

$$\because \sigma_n \gg \sigma_{anomaly}$$

$$Y_s(p,q) = \sigma_0 \cdot \iint_\Omega (x+iy)^{p-2}(x-iy)^{q-2}\,dx\,dy -$$

$$\sigma_0 \cdot \int_{\Omega_{anomaly}} \int (x+iy)^{p-2}(x-iy)^{q-2}\,dx\,dy$$

In the equations above, p and q define the row and column in the matrix and x and y define the coordinates of the pixels. Thus, the $Y_s$ elements define the moments that are used in the iterative solution process described herein. Additionally, it should be noted that a homogeneous distribution is assumed.

It also should be noted that the following portion of Equation 7 is precomputed:

$$\sigma_0 \cdot \iint_\Omega (x+iy)^{p-2}(x-iy)^{q-2}\,dx\,dy$$

The $Y_s$ elements also may be expressed in polar coordinates as follows:

$$-\sigma_0 \cdot \iint_{\Omega_{anomaly}} (x+iy)^{p-2}(x-iy)^{q-2}\,dx\,dy = \quad \text{Equation 8}$$

$$-\sigma_0 \cdot \iint_{\Omega_{anomaly}} r^{p+q-4} e^{(p-q)i\theta}\,dx\,dy$$

Figure 7:
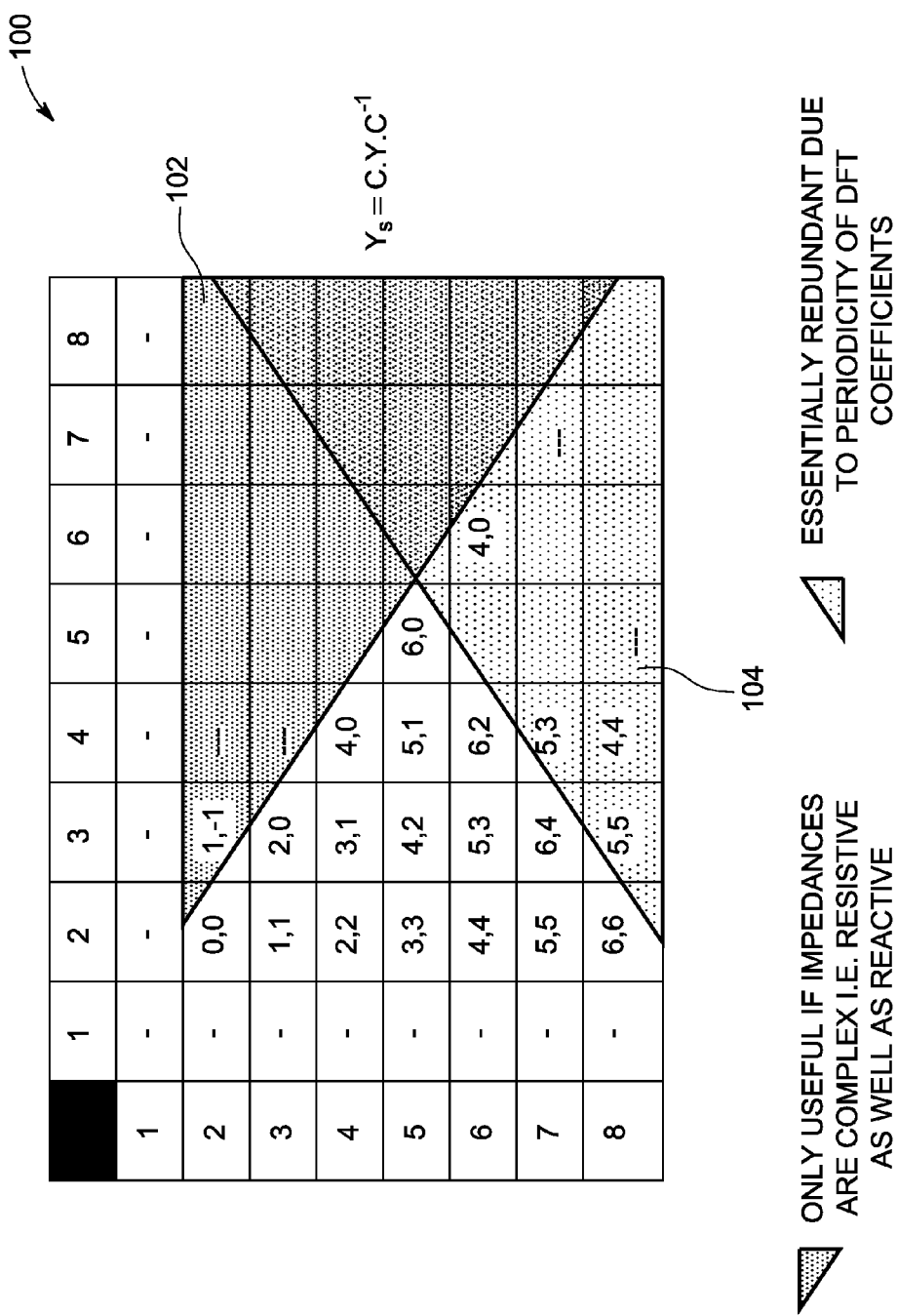
FIG. 7 is a table showing values of moments of inertia calculated in accordance with various embodiments.

In various embodiments, the $Y_s$ element properties may be organized in a table 100 as illustrated in FIG. 7 showing the values of the calculated moments of inertia. In the table 100, the rows are the values for p and the columns are the values for q in the Equations 5 through 8 above. It should be noted that the values in the portion 102 are useful if the impedances are complex, namely resistive as well as reactive. Additionally, the values in the portion 102 are essentially redundant due to the periodicity of the coefficients used in the equations.

Figure 8:
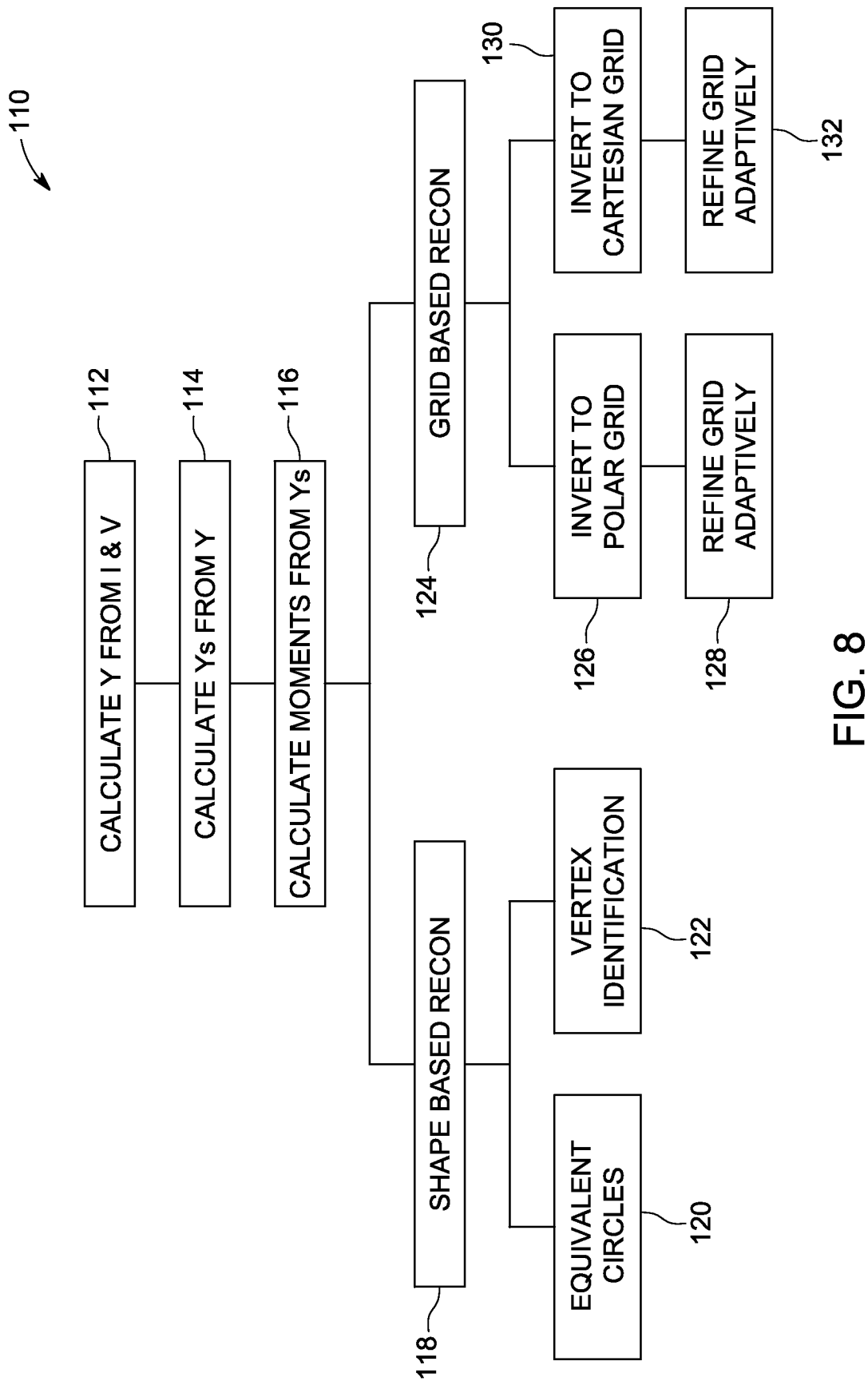
FIG. 8 is a flowchart of a method for soft-field reconstruction using symmetric components in accordance with other various embodiments.

In various embodiments, a method 110 as illustrated in FIG. 8 is provided that defines a symmetric components approach to EIT. In particular, the method 110 includes at 112 calculating the admittance value Y from the applied excitations and measured responses, such as from the applied currents (I) and measured voltages (V) using the plurality of transducers 24 (shown in FIG. 1). For example, Y may be calculated as $Y = I \cdot (V^H V)^{-1} \cdot V^H$. Thereafter, at 114, $Y_s$ may be calculated from Y using $Y_s = C \cdot Y \cdot C^{-1}$ (defining a pre-multiplication and post-multiplication process), where C and $C^{-1}$ are a transformation matrix and the inverse thereof, respectively. The transformation matrix may be any suitable matrix, such as an orthogonal matrix. In one embodiment, the transformation matrix is a Fourier transform matrix defined as follows:

$$C = \begin{bmatrix} 1 & 1 & 1 & \cdots & 1 \\ 1 & \alpha & \alpha^2 & \cdots & \alpha^{n-1} \\ 1 & \alpha^2 & \alpha^4 & \cdots & \alpha^{2(n-1)} \\ \vdots & \vdots & \vdots & \vdots & \vdots \\ 1 & \alpha^{n-1} & \alpha^{2(n-1)} & \cdots & \alpha^{(n-1)(n-1)} \end{bmatrix} \quad \text{Equation 9}$$

where $$\alpha = e^{i2\pi/n}$$

$$\alpha^{n \cdot g + h} = \alpha^h \quad \because \quad \alpha^n = 1$$

Thereafter, at 116, the moments are calculated from $Y_s$ as described above. The calculated moments are used in an iterative SCT reconstruction process, which may be a shape based reconstruction at 118 or a grid based reconstruction at 124. It should be noted that the reconstruction processes may be performed using any suitable distribution reconstruction method.

With respect to the shaped based reconstruction at 118, in one embodiment, equivalent circles are used at 120 and a vertex identification performed at 122. However, it should be noted that any shape, and in particular, any basic geometric shape, instead of a circle may be assumed for use in the reconstruction. Thus, the anomaly may be assumed to be any geometric shape.

The shape based reconstruction at 118 includes in one embodiment using circles, which are completely described by three coordinates ($x_c, y_c, R$). In this embodiment, the number of independent variables divided by 3 equals the maximum number of equivalent circles. Thus, regions of interest 32 (as illustrated in FIG. 3) may be assumed to be circles, which may represent, for example, bubbles in flowing petroleum. Thus, an initial assumption or approximation of a plurality of circles may be used to determine the size and location of the regions of interest 32, which may be air anomalies within the flowing liquid. In one embodiment, two $\sigma$ regions may be assumed, one representing the region of interest 32 (e.g., the anomaly) and one representing the background. However, additional circles may be used to assume additional regions of interest 32. Using the assumption of circular regions of interest 32 provides a simple visualization, such as for flow measurement visualizations. The reconstruction method then uses the calculated moments to converge to a solution as described in more detail below.

In one embodiment, the grid based reconstruction at 124 includes an inversion to a polar grid at 126 followed by an optional refining of the grid at 128, which may be performed adaptively. In particular, the polar grid inversion may be performed using the following equations:

$$M_{mn} = \int_{\Omega_{anomaly}} \int r^m e^{i\theta \cdot n} dA$$ Equations 10 and 11

$$M_{mn}(R, t, \theta_1, \Delta\theta) = \int_R^{R+t} \int_{\theta_1}^{\theta_1+\Delta\theta} r^{m+1} e^{i\theta \cdot n} dr d\theta$$

$$= \frac{1}{m+2}\{(R+2)^{m+2} - R^{m+2}\}\Delta\theta$$ Equations 12 and 13 when $n = 0$ $$= \frac{1}{(m+2)(ni)}$$

$$\{(R+2)^{m+2} - R^{m+2}\}\{e^{in(\theta_1+\Delta\theta)} - e^{in\cdot\theta_i}\}$$

when $n > 0$

Figure 9:
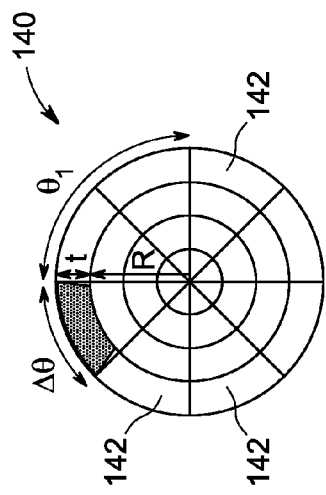
FIG. 9 is a diagram of a grid for a polar inversion process in accordance with various embodiments.

It should be noted that Equation 13 may be pre-computed. A grid 140 for the polar inversion may be provided as shown in FIG. 9, which in this embodiment represents the cross-section of the pipe 42 (shown in FIG. 2) or other tubular structure. In the grid 140, each segment 142 represents a pixel in the reconstructed representation. In this embodiment, there are 8 octants, each defined by 4 segments at radially (R) different locations. It should be noted that once the moment is calculated, the location of each of the pixels represented by the segments 142 is also known.

Figure 10:
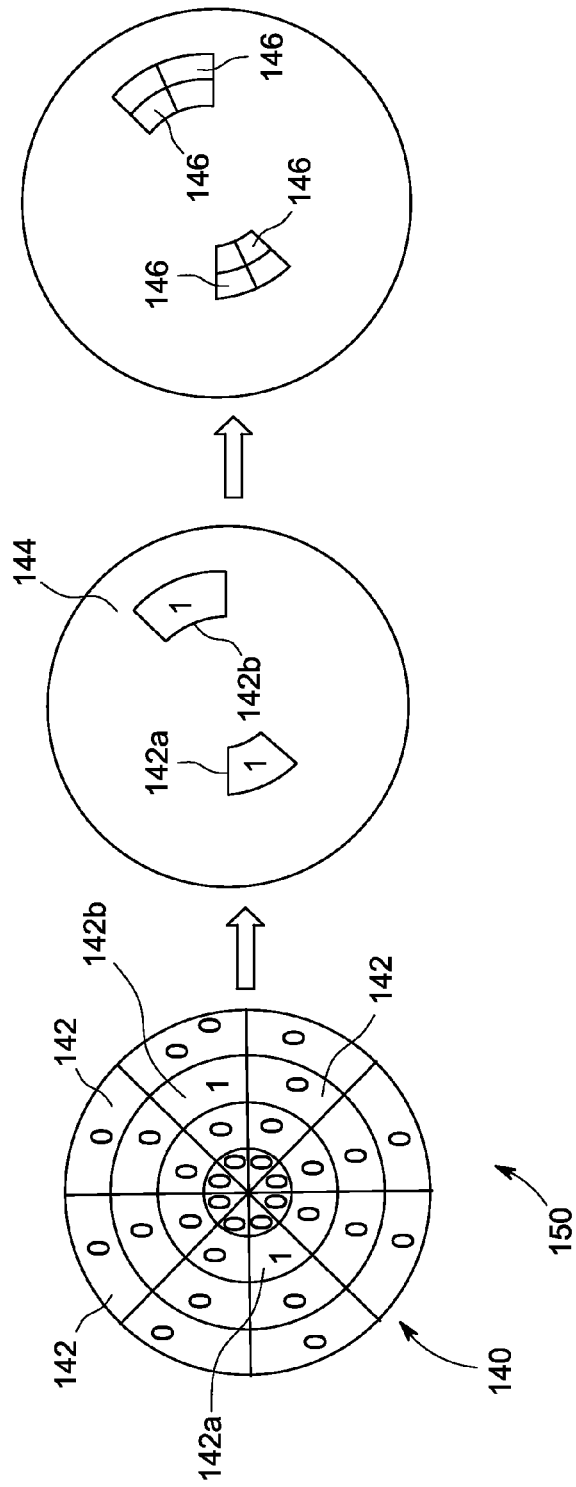
FIG. 10 is a diagram illustrating a polar grid inversion process in accordance with various embodiments.

Thus, in one embodiment, a polar grid inversion process 150 may be performed as illustrated in FIG. 10. As can be seen, two of the segments 142*a* and 142*b* are initially assumed to have a much lower conductivity (namely 1 instead of 0). The contribution of each segment 142 to each moment also may be precomputed. In particular, the coefficient relating $Y_s$ to the moments may be precomputed, such as based on modeling, simulations, or anomaly configurations, among others. It should be noted that the precomputations may be verified with static experiments.

The system of linear equations described herein for the precomputed segments 142 and the measured moments are solved to obtain a first approximation. Accordingly, σ values are determined and allocated to each of the segments 142. For example, the grid 140 may be modified to include a single background area 144 and the two separate segments 142*a* and 142*b*.

In order to better define the boundaries, such as to determine the boundaries of a second phase, the segments 142*a* and 142*b* are further divided into sections 146 to refine the measurements. It should be noted that all of the other segments 142 (other than the segments 142*a* and 142*b*) are no longer used in the calculations. Thus, the moments for the further divided segments 142*a* and 142*b* for the secondary phase are determined.

Accordingly, in various embodiments, a mesh and an inverse thereof are assumed with the distribution approximated using a superimposition of geometric shapes. For example, in one embodiment circles are used as an approximation of a secondary phase (e.g., bubbles in gas or oil).

In another embodiment, the grid based reconstruction at 124 includes an inversion to a Cartesian grid at 130 followed by an optional refining of the grid at 132, which may be performed adaptively. This conversion is performed similarly to the polar grid inversion process described above.

Thus, various embodiments provide a matrix transformation approach, for example, an SCT based EIT that uses a spatial frequency reconstruction that utilizes multiple σ's ($-\sigma_0, \sigma_1, \sigma_2 \ldots$). With the precomputation, the reconstruction process of various embodiments does not solve differential equations, but instead algebraic or polynomial equations, which is computationally faster. Accordingly, the SCT based EIT may be used for reconstruction on high contrast materials, such as materials with a volume flow.

Figure 11:
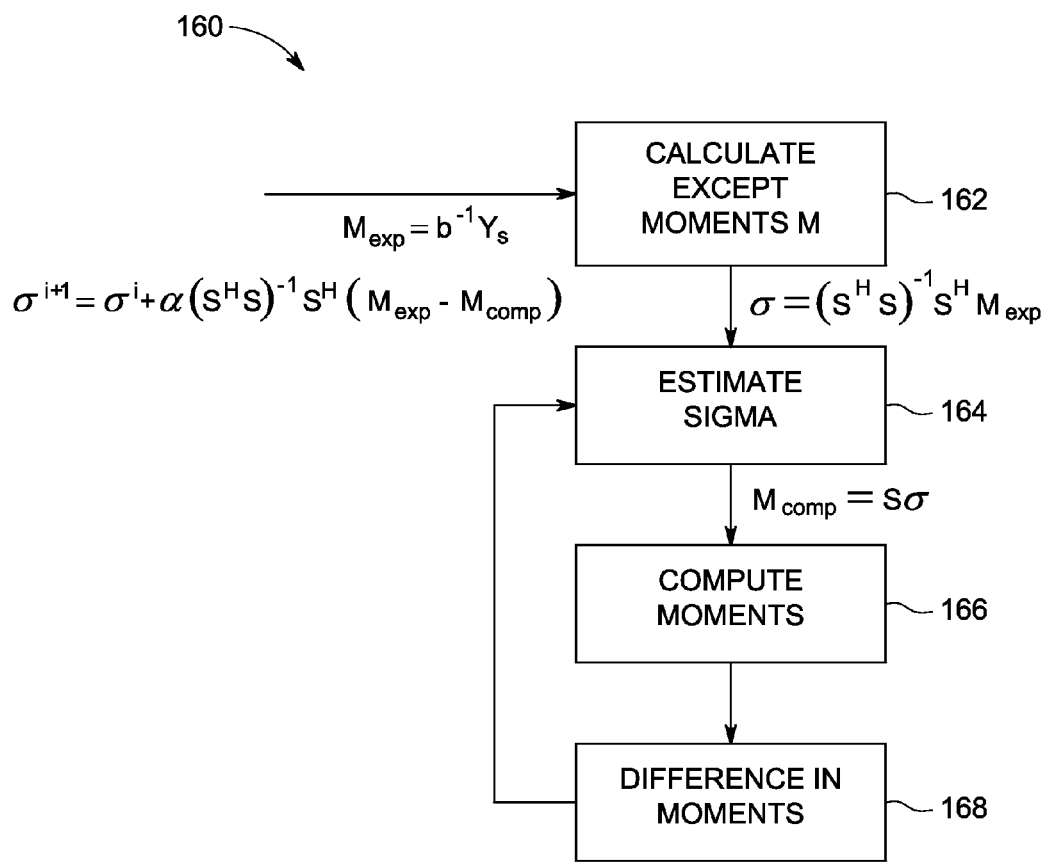
FIG. 11 is a flowchart of a method for performing a symmetrical component transform (SCT) iterative reconstruction in accordance with various embodiments.

In one embodiment, a method 160 for an SCT iterative reconstruction may be performed as illustrated in FIG. 11. The method 160 may provide a coarse, but characteristic representation of the general distribution of anomalies. The method 160 includes calculating experimental moments M at 162, such as using the soft-field tomography instrument 54, where $M_{exp} = b^{-1}Y_s$. Thereafter, the conductivity is estimated at 164, which in one embodiment is defined as:

$$\sigma = (S^H S)^{-1} S^H M_{exp}$$ Equation 14

It should be noted that different shapes or grids may be used in the estimation as described in more detail herein. For example, any type of grid may be used, such as a polar grid, triangular grid, or rectangular grid, among others.

Thereafter the moments are calculated at 166, which may be defined as $M_{comp} = S\sigma$. It should be noted that S may be changed based on a precisely conversed solution, which is then refined after areas of interest (e.g., anomalies) are identified.

Then, the difference in the calculated moments from a current iteration and experimentally calculated moments are determined at 168. The difference defines an updating term used to update the estimate at 164 in this iterative process. The updating term calculated from the difference in moments may be defined as follows:

$$\sigma^{i+1} = \sigma^i + \alpha(S^H S)^{-1} S^H (M_{exp} - M_{comp})$$ Equation 15

The updated term (e.g., an error term) is then input back to the estimating step at 164, such that an updated conductivity distribution is provided iteratively. This iterative process is performed until convergence of a solution is reached, for example, when: $M_{comp} \approx M_{exp}$. Accordingly, convergence may be reached when there is no difference or a predetermined difference (e.g., acceptable variance) in the difference in moments.

Thus, in various embodiments, the SCT iterative reconstruction uses a matrix multiplication process as described herein. Additionally, the Jacobian (S) in inverse is pre-computed. In one embodiment, a rectangular mesh is used to increase the reconstruction rate, for example, to about 2500 frames per second. Using other shaped meshes may result in different reconstruction rates. For example, using a triangular mesh, a reconstruction rate of about 80 frames per second may be provided in some embodiments.

Accordingly, using various embodiments determine Y from the applied excitations and measured responses. Then, $Y_s$ may be determined from Y. Thereafter, the moments may be determined as $Y_s/b$, which are used in the iterative reconstruction.

The various embodiments and/or components, for example, the modules, elements, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software", "firmware" and "algorithm" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing therefrom. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for soft-field tomography reconstruction, the method comprising:
    obtaining applied input and measured output information for an excited object using a plurality of transducers;
    forming an admittance matrix based on the applied input and measured output information, the admittance matrix including a plurality of admittance elements;
    determining a plurality of moments from the plurality of admittance elements using the admittance matrix;
    transforming the admittance matrix and determining the plurality of moments using the transformed admittance matrix, wherein the plurality of admittance elements are determined from a moments matrix defined by a structure matrix, the structure matrix pre-computed based on a geometry of a soft-field tomography instrument that obtains the applied input and measured output information for the excited object using the plurality of transducers; and
    calculating a property distribution of the excited object using the plurality of moments.

2. The method of claim 1, further comprising iteratively comparing the plurality of determined moments to a plurality of calculated experimental moments to calculate an estimate of the property distribution.

3. The method of claim 1, wherein the plurality of moments are electromagnetic moments and further comprising using a Fourier transform matrix for the transforming and calculating the property distribution of the excited object by minimizing an energy function of the plurality of moments, wherein the energy function defines an energy of a conductivity distribution.

4. The method of claim 1, further comprising using a shape based reconstruction to calculate the property distribution.

5. The method of claim 4, wherein the shape based reconstruction uses a mesh formed from one of rectangular and circular elements.

6. The method of claim 1, further comprising using a grid based reconstruction to calculate the property distribution.

7. The method of claim 6, further comprising adaptively refining a grid mesh used for the grid based reconstruction.

8. The method of claim 7, further comprising iteratively comparing the plurality of determined moments to a plurality of calculated experimental moments for the refined grid mesh to calculate an estimate of the property distribution.

9. The method of claim 6, wherein the grid based reconstruction comprises inverting to one of a polar grid or a Cartesian grid.

10. The method of claim 1, wherein the excited object is a pipe and the plurality of transducers form a plurality of rings along an inner circumference of the pipe, the plurality of rings spaced apart axially along the pipe.

11. The method of claim 10, wherein calculating the property distribution comprises calculating the property distribution of gas flowing within the pipe.

12. The method of claim 10, further comprising calculating a velocity of gas flowing within the pipe using a soft-field reconstruction at the plurality of rings.

13. The method of claim 1, wherein the property distribution is a distribution as determined in one of Electrical Impedance Tomography (EIT), Diffuse Optical Tomography (DOT), Near InfraRed Spectroscopy (NIRS), thermography, elastography or microwave tomography.

14. The method of claim 1, wherein the property distribution comprises a distribution of one or more of electric conductivity, electric permittivity, magnetic permeability, optical absorbance, optical scattering, optical reflectivity, elasticity, or thermal conductivity.

15. A method for soft-field tomography reconstruction, the method comprising:
obtaining applied input and measured output information for an excited object using a plurality of transducers;
performing a symmetrical component transform (SCT) iterative reconstruction using the applied input and measured output information and an admittance matrix having a plurality of admittance elements related to a plurality of moments;
transforming the admittance matrix and determining the plurality of moments using the transformed admittance matrix, wherein the plurality of admittance elements are determined from a moments matrix defined by a structure matrix, the structure matrix pre-computed based on a geometry of a soft-field tomography instrument that obtains the applied input and measured output information for the excited object using the plurality of transducers; and
determining a property distribution of the excited object based on the SCT iterative reconstruction.

16. The method of claim 15, wherein the SCT iterative reconstruction comprises a spatial frequency reconstruction and determining the property distribution includes performing iterative reconstruction that iterates on a plurality of determined moments from an admittance matrix reconstruction process and not a plurality of measured currents.

17. The method of claim 15, wherein the excited object is a pipe and the plurality of transducers form a plurality of rings along an inner circumference of the pipe, the plurality of rings spaced apart axially along the pipe, and wherein determining the property distribution comprises determining the distribution of gas flowing within the pipe.

18. A soft-field tomography system comprising:
a plurality of transducers configured for positioning proximate a surface of an object;
one or more excitation drivers coupled to the plurality of transducers and configured to generate excitation signals for the plurality of transducers;
one or more response detectors coupled to the plurality of transducers and configured to measure a response of the object on the plurality of transducers to the excitation applied by the plurality of transducers based on the excitation signals; and
a soft-field reconstruction module configured to reconstruct a property distribution of the object based on the excitation signals and the measured response using a plurality of determined moments from an admittance matrix reconstruction process, wherein the plurality of determined moments are calculated from a plurality of admittance elements of an admittance matrix, the plurality of admittance elements being related to the plurality of determined moments, the soft-field reconstruction module further configured to transform the admittance matrix and determine the plurality of moments using the transformed admittance matrix, wherein the plurality of admittance elements are determined from a moments matrix defined by a structure matrix, the structure matrix pre-computed based on a geometry of a soft-field tomography instrument that obtains the applied input from the one or more excitation drivers and measured response for the excited object using the plurality of transducers.

19. The soft-field tomography system of claim 18, wherein the object is a pipe and the plurality of transducers form a plurality of rings along an inner circumference of the pipe, the plurality of rings spaced apart axially along the pipe, and wherein the soft-field reconstruction module is further configured to calculate the property distribution of gas flowing within the pipe.

* * * * *